(12) United States Patent
Geissler et al.

(10) Patent No.: US 10,910,909 B2
(45) Date of Patent: Feb. 2, 2021

(54) ELECTRIC MOTOR COMPRISING A ROTOR, A STATOR AND AN ELECTRONIC HOUSING AS WELL AS FAN WHEEL FOR AN ELECTRIC MOTOR

(71) Applicant: Ziehl-Abegg SE, Künzelsau (DE)

(72) Inventors: Samantha Geissler, Ingelfingen (DE); Thorsten Sturm, Krautheim (DE); Joachim Knorr, Niederstetten (DE); Julian Schütz, Ingelfingen (DE)

(73) Assignee: Ziehl-Abegg SE, Künzelsau (DE)

( * ) Notice: Subject to any disclaimer, the term of this patent is extended or adjusted under 35 U.S.C. 154(b) by 561 days.

(21) Appl. No.: 15/319,864

(22) PCT Filed: Jun. 15, 2015

(86) PCT No.: PCT/EP2015/001196
§ 371 (c)(1),
(2) Date: Dec. 19, 2016

(87) PCT Pub. No.: WO2015/192954
PCT Pub. Date: Dec. 23, 2015

(65) Prior Publication Data
US 2017/0141642 A1   May 18, 2017

(30) Foreign Application Priority Data
Jun. 20, 2014   (DE) .................. 10 2014 009 146

(51) Int. Cl.
*H02K 5/20* (2006.01)
*H02K 9/06* (2006.01)
(Continued)

(52) U.S. Cl.
CPC ............. *H02K 5/20* (2013.01); *F04D 25/06* (2013.01); *F04D 25/08* (2013.01); *F04D 29/263* (2013.01);
(Continued)

(58) Field of Classification Search
CPC . H02K 5/20; H02K 7/14; H02K 11/33; H02K 9/06; H02K 9/08; F04D 29/5806;
(Continued)

(56) References Cited

U.S. PATENT DOCUMENTS 1,335,129 A   3/1920   Schroeder
4,639,193 A * 1/1987   Reichert ............... F04D 29/281
                                                            416/134 R
(Continued)

FOREIGN PATENT DOCUMENTS

CN   101 846 087   9/2010
DE   103 13 274    2/2004
(Continued)

OTHER PUBLICATIONS

Translated version of foreign patent No. JPH11243668 A from Espacenet website. (Year: 1999).*
(Continued)

*Primary Examiner* — Shawki S Ismail
*Assistant Examiner* — Htet Z Kyaw
(74) *Attorney, Agent, or Firm* — Gudrun E. Huckett

(57) ABSTRACT

The invention relates to an electric motor comprising a rotor, a stator (1) and an electronic housing (12), the installation space (13) of which accommodates electrical/electronic components (18). At least part of these components (18) is seated on a printed circuit board (19). A fan wheel (21) is located inside the installation space. It is arranged and designed in such a manner that it generates a cooling circuit stream in the installation space (13), in which the air is drawn in centrally from the fan wheel (21) and is discharged approximately radially to the outside. As a result of this defined cooling air stream, the components (18) are evenly cooled in the installation space (13). The fan wheel (21) consists at least of a base body which comprises blades (22)
(Continued)

located between a cover disc (24) and a base disc (23). In this way, the fan wheel (21) generates a directed cooling air stream for cooling the heat-generating components.

20 Claims, 12 Drawing Sheets

(51) Int. Cl.
| | |
|---|---|
| H02K 9/08 | (2006.01) |
| H02K 11/33 | (2016.01) |
| F04D 29/28 | (2006.01) |
| F04D 25/08 | (2006.01) |
| F04D 29/26 | (2006.01) |
| F04D 25/06 | (2006.01) |
| F04D 29/58 | (2006.01) |
| H02K 7/14 | (2006.01) |

(52) U.S. Cl.
CPC ......... *F04D 29/281* (2013.01); *F04D 29/282* (2013.01); *F04D 29/5806* (2013.01); *H02K 7/14* (2013.01); *H02K 9/06* (2013.01); *H02K 9/08* (2013.01); *H02K 11/33* (2016.01); *F05D 2230/21* (2013.01); *F05D 2300/43* (2013.01)

(58) Field of Classification Search
CPC ........ F04D 25/06; F04D 29/281; F04D 25/08; F04D 29/263; F04D 29/282; F04D 17/16; F04D 25/082; F04D 29/002; F04D 29/26; F04D 29/28; F04D 29/283; F05D 2230/21; F05D 2300/43
USPC .......................................................... 310/62
See application file for complete search history.

(56) References Cited

U.S. PATENT DOCUMENTS

| | | | | |
|---|---|---|---|---|
| 5,310,313 A | * | 5/1994 | Chen | F04D 25/105 416/100 |
| 6,130,491 A | | 10/2000 | Mitamura et al. | |
| 6,141,217 A | * | 10/2000 | Nakahama | H05K 7/20145 165/104.33 |
| 6,220,819 B1 | * | 4/2001 | Chien | F04D 29/2222 416/186 R |
| 6,345,956 B1 | | 2/2002 | Lin | |
| 7,112,906 B2 | * | 9/2006 | Chou | H02K 1/2786 310/156.12 |
| 7,330,006 B2 | * | 2/2008 | Iwata | B25F 5/008 318/400.41 |
| 8,134,261 B2 | * | 3/2012 | Ikaheimo | F04D 25/082 310/58 |
| 2006/0255756 A1 | * | 11/2006 | Iwata | B25F 5/008 318/400.41 |
| 2008/0095626 A1 | * | 4/2008 | Krogmeier | F04D 29/263 416/146 R |
| 2008/0193275 A1 | | 8/2008 | De Filippis et al. | |
| 2009/0224626 A1 | * | 9/2009 | Eppler | H02K 1/146 310/215 |
| 2010/0329857 A1 | * | 12/2010 | Heli | F04D 25/0613 415/182.1 |
| 2011/0148230 A1 | * | 6/2011 | Knorr | H02K 1/2786 310/62 |
| 2012/0076672 A1 | * | 3/2012 | Binder | F04D 25/084 417/234 |
| 2014/0334952 A1 | * | 11/2014 | Ziegler | F04D 25/0606 417/423.1 |
| 2015/0333591 A1 | * | 11/2015 | Cheong | H02K 1/22 310/71 |

FOREIGN PATENT DOCUMENTS

| | | |
|---|---|---|
| EP | 1 715 565 | 10/2006 |
| JP | H11 243668 | 9/1999 |
| JP | 2009-050062 | 3/2009 |
| WO | 2008/006934 | 1/2008 |

OTHER PUBLICATIONS

Received STIC search report from EIC 2800 searcher Samir Patel dated Nov. 2, 2018 for claim 34. (Year: 2018).*
Received STIC search report from EIC 2800 searcher Samir Patel dated Nov. 1, 2018 for claim 24. (Year: 2018).*

* cited by examiner

ELECTRIC MOTOR COMPRISING A ROTOR, A STATOR AND AN ELECTRONIC HOUSING AS WELL AS FAN WHEEL FOR AN ELECTRIC MOTOR

BACKGROUND OF THE INVENTION

The invention concerns an electric motor comprising a rotor, a stator, and an electronics housing having an installation space in which electric/electronic components are housed of which at least one some are seated on the circuit board, and comprising a fan wheel. The invention also concerns a fan wheel for an electric motor of the aforementioned kind.

The heat that is produced during use of electric motors is dissipated wherein frequently fan wheels are used that generate a cooling air flow.

DE 103 13 274 A1 discloses an electric motor in which the fan wheel is arranged between the stator flange and the control electronics. The fan wheel only swirls the air so that the electric/electronic components housed in the electronics housing are only insufficiently cooled.

It is also known (U.S. Pat. No. 6,141,217 A) to arrange a fan wheel in an installation space of an electronics housing of an electric motor. The components to be cooled are located in the area above the fan wheel whose vanes project away from a disk that is seated on the rotor shaft. With such a fan wheel a targeted cooling airflow and thus an optimal cooling of the components housed in the installation space cannot be achieved however. The cooling air is only swirled by means of this fan wheel in the central area.

The invention has the object to design the electric motor of the aforementioned kind and the fan wheel of the aforementioned kind in such a way that the electric/electronic components housed in the installation space of the electronics housing are optimally cooled.

SUMMARY OF THE INVENTION

This object is solved for the electric motor of the aforementioned kind in accordance with the invention in that the fan wheel is arranged within the installation space and designed such that it generates a cooling circuit flow in the installation space in that the air is sucked in centrally by the fan wheel and is discharged approximately radially in outward direction. The object is further solved for the fan wheel of the aforementioned kind in accordance with the invention in that the fan wheel is comprised at least of a base member that comprises the vanes which are positioned between a cover disk and a bottom disk.

In the electric motor according to the invention, the fan wheel generates a defined cooling air flow within the installation space. For this purpose, the fan wheel is designed and arranged such that the cooling air in the installation space is guided in a cooling circuit flow in that the cooling air is sucked in centrally by the fan wheel and is discharged approximately radially in outward direction. The fan wheel is located advantageously in the area between these components which are distributed about the fan wheel. Accordingly, all components are located within the cooling air flow of the fan wheel so that an excellent dissipation of heat from the components is ensured.

Advantageously, the vanes of the fan wheel are positioned in the area between a cover disk and a bottom disk of the fan wheel. In this way, a targeted air flow can be achieved upon rotation of the fan wheel.

Due to the cover disk, the cooling air is centrally sucked in by the fan wheel and passes through the cover disk axially into the area of the vanes which subsequently convey the cooling air between the cover disk and the bottom disk approximately radially in outward direction. The vanes are arranged in this context advantageously such that, viewed in axial direction of the fan wheel, they extend radially in inward direction across the cover disk.

Due to this configuration, the fan wheel can be arranged in the area between the components so that the installation space and thus the electronics housing require no large axial length.

The fan wheel is preferably arranged centrally in the installation space so that the cooling air flow can be conveyed in even distribution about the circumference of the installation space.

In a preferred embodiment, the sidewall of the installation space and a cover which is closing off the installation space provide guiding means for the cooling air. When the cooling air is conveyed radially in outward direction, it impacts on the sidewall of the installation space and is deflected by it in the direction toward the cover. Here, the cooling air is again deflected so that it flows along the inner side of the cover in the direction of the cover center. Here, the cooling air reaches the suction area of the fan wheel so that the cooling air is axially sucked in centrally. In this way, a targeted cooling air circuit flow is generated about the circumference of the installation space which leads to an optimal cooling of the components in the installation space. The cooling air can transfer at least a portion of the heat to the sidewall and the cover.

When the inner wall of the installation space is substantially cylindrically designed, a uniform distribution of the cooling air about the entire circumference of the installation space is provided.

The circuit board on which at least some of the components to be cooled are disposed is positioned at a spacing relative to a stator flange that closes off the installation space relative to the rotor. The circuit board is provided with an opening through which the fan wheel projects into the installation space.

A stator bushing adjoins the stator flange and a rotor shaft is rotatably supported therein. The stator flange and the stator bushing are advantageously formed together as one piece.

In a preferred embodiment, the fan wheel is designed to be at least of a two-part configuration. In this case, the fan wheel is comprised of a base member comprising the vanes and a connector part. These two parts of the fan wheel are connected fixedly with the rotor shaft. As a result of the two-part configuration, the fan wheel can be simply and inexpensively produced and mounted in the electric motor.

Advantageously, the base member comprises the cover disk and the connector part comprises the bottom disk for the vanes. When the base member and the connector part are connected to each other for forming the fan wheel, then the vanes extend between the cover disk and the bottom disk. Since the bottom disk and the cover disk are distributed onto the two components of the fan wheel, the base member and the connector part each can be produced very simply, in particular by injection molding.

A simple connection of the two parts of the fan wheel results when the base member and the connector part engage each other by means of a respective sleeve. The two parts can then be connected to each other by a simple plug-in process.

In this context, it is advantageous when the sleeve of the base member is inserted in such a way into the sleeve of the connector part that it has radial clearance relative to the inner wall of the sleeve of the connector part.

In this context, the two sleeves can be embodied to conically taper in the direction toward their free ends so that the joining process is facilitated. Also, the conical sleeves form removing drafts for injection molding. The inwardly positioned sleeve of the base member can be designed such that it is screwed by means of a fastening screw onto the rotor shaft.

The fan wheel according to the invention is characterized in that it is comprised at least of the base member. In this context, the base member is provided with the vanes that are positioned between the cover disk and the bottom disk. With this configuration, it is achieved that the fan wheel produces a targeted cooling air flow so that an excellent cooling of the heat-generating components is ensured.

Preferably, the fan wheel comprises at least one connector part interacting with the base member.

A simple and inexpensive manufacture results when the base member comprises the cover disk and the connector part comprises the bottom disk. In this way, the base member and the connector part can be produced in a simple way by injection molding without complex molds being required for this.

The vanes of the fan wheel are advantageously formed as one piece together with the base member. The base member and the connector part are joined in such a way that, when the fan wheel is mounted, the vanes of the base member are resting on the bottom disk of the connector part.

In a preferred embodiment, the base member and the connector part are contacting each other with stops in axial direction. In this way, there is the possibility to connect the base member and the connector part with the rotor shaft by means of only one fastening screw. When by means of the fastening screw the base member is axially pulled against the rotor shaft, then also the connector part is pulled in the direction toward the rotor shaft by means of the stops.

Instead of this screw connection, the fan wheel can also be fixedly connected in other ways to the rotor shaft, for example, by a clip-on connection, a locking connection and the like.

A simple connection of base member and connector part results when the base member is provided with a sleeve which is extending in axial direction of the fan wheel. This sleeve can serve as a plug-in part in order to connect the base member with the connector part.

In this context, it is advantageous when the sleeve is tapering conically in the direction toward its free end.

A simple attachment of the fan wheel on the rotor shaft results when the sleeve of the base member is closed off at the free end by a disk that has an opening for passage of the fastening screw. It is screwed into a threaded bore at the end face of the rotor shaft. In this context, the base member is pulled axially in the direction toward the rotor shaft by means of the disk.

The connector part is advantageously also provided with a sleeve which is extending in axial direction of the fan wheel and also advantageously tapers conically in the direction toward its free end.

Advantageously, the sleeve of the base member is positioned opposite the inner wall of the sleeve of the connector part with radial clearance.

Mounting and assembly are facilitated in an advantageous way in that the base member and the connector part in circumferential direction and/or in radial direction are connected to each other with form fit. Form fit in circumferential direction can be achieved, for example, in that the base member comprises at least one, preferably a plurality of radially extending ribs which engage radially extending depressions of the connector part.

Form fit in radial direction can be achieved, for example, in that the base member has a round projection and the connector part has a corresponding round depression which are embodied each coaxially in relation to the axis of the fan wheel.

The combined form fit connection in radial direction and in circumferential direction can be achieved in an advantageous way in that the round projection of the base member is provided at the end face with at least one radially extending rib and the round depression of the connector part is provided with at least one radially extending depression.

The arrangement of projections and depressions can also be switched relative to the base member and the connector part.

The subject matter of the application results not only from the subject matter of the individual claims but also from all specifications and features disclosed in the drawings and the description. They are claimed as being important to the invention, even when they are not subject matter of the claims, inasmuch as they are new, individually or in combination, relative to the prior art.

Further features of the invention result from the additional claims, the description, and the drawings.

BRIEF DESCRIPTION OF THE DRAWINGS

The invention will be explained in more detail with the aid of the embodiment illustrated in the drawings. It is shown in.

DESCRIPTION OF PREFERRED EMBODIMENTS

Figure 1:
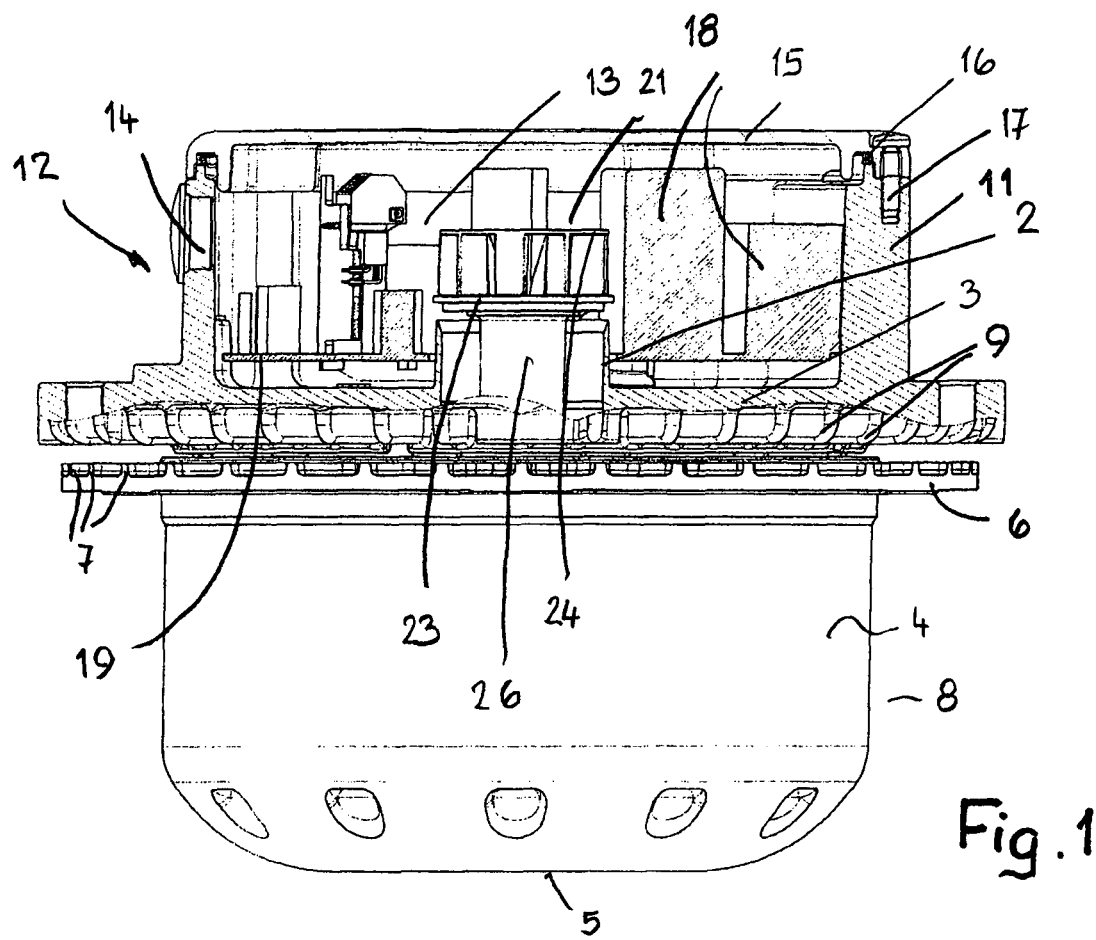
FIG. 1 an electric motor according to the invention, partially in axial section and partially in elevation view.
Figure 2:
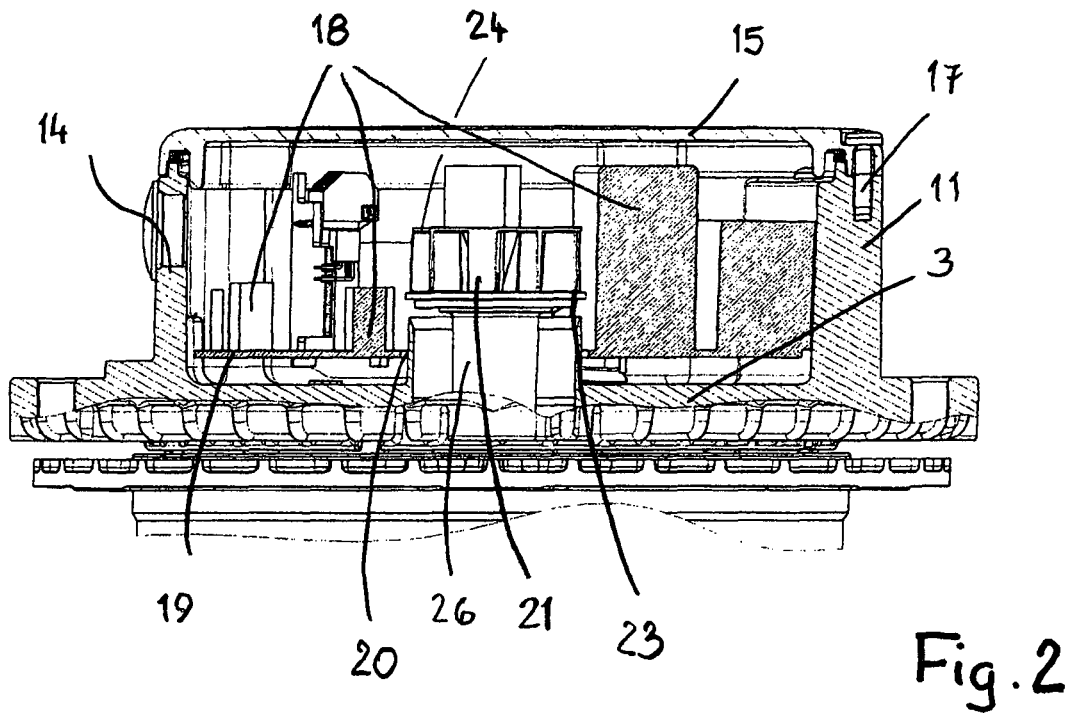
FIG. 2 the electronics housing of the electric motor according to FIG. 1, partially in axial section and partially in elevation view.
Figure 3:
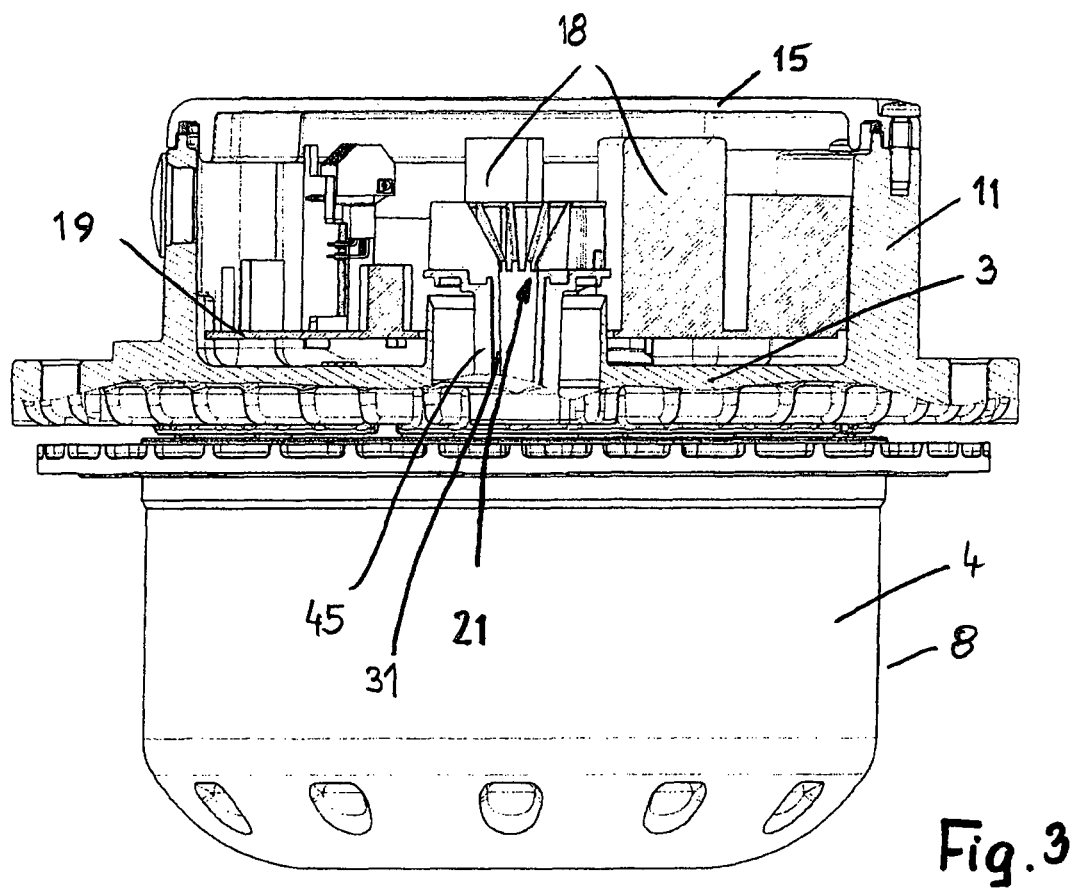
FIG. 3 and FIG. 4 the electric motor according to the invention in illustrations corresponding to FIGS. 1 and 2, wherein however a fan wheel according to the invention of the electric motor according to the invention is shown in axial section.
Figure 4:
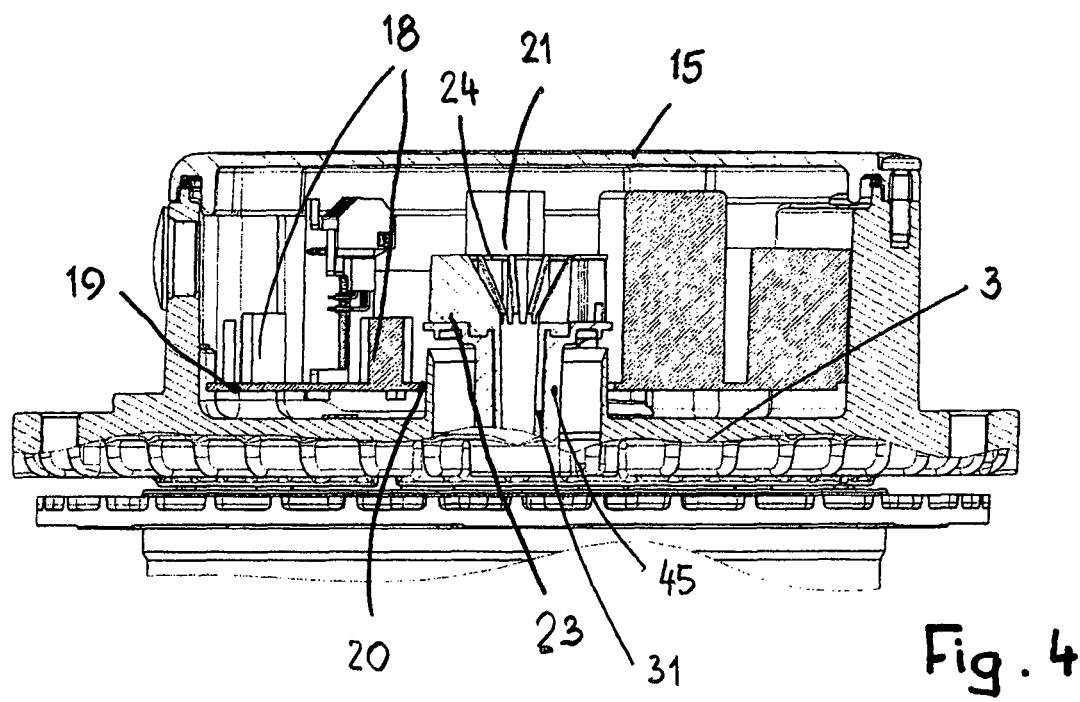

The electric motor is designed as an exterior rotor motor, in particular as an electronically commutated direct current external rotor motor. It comprises a stator 1 and a stator bushing 2 of which only the upper end can be seen in the drawings. A stator flange 3 adjoins the stator bushing 2 and is advantageously formed as one piece together with the stator bushing 2. In the stator bushing, a rotor shaft, not illustrated, is rotatably supported on which fixedly a rotor jacket 4 is seated. It is of a hood-shaped configuration and with its bottom 5 fixedly connected to the rotor shaft. On the end which is neighboring the stator flange 3, the rotor jacket 4 is provided with a circumferentially extending annular flange 6 which is extending parallel to the stator flange 3 and is provided with cooling ribs 7 on its side facing the stator flange. They are distributed uniformly about the circumference of the annular flange 6 and extend advantageously radially, respectively. However, the cooling ribs 7 can also be positioned at an angle relative to the respective radial line or can also have a shape deviating from a straight course.

On the stator bushing, a stator lamination pack, not illustrated, with corresponding windings is positioned. On the inner side of the rotor jacket 4 permanent magnets are provided which surround the stator lamination pack with formation of an air gap.

At its side which is facing the annular flange 6 of the rotor, the stator flange 3 is provided with cooling ribs 9 which advantageously are distributed uniformly about the circumference of the stator flange and each extend advantageously in radial direction. The cooling ribs 9 are positioned with minimal axial spacing opposite the cooling ribs 7 of the rotor 8. The cooling ribs 9 can also be positioned at an angle relative to the respective radial line or can have a configuration deviating from a straight course. In the area between the cooling ribs 7 and 9, air turbulence is generated in operation of the electric motor by means of the cooling ribs 7 at the rotor in interaction with the cooling ribs 9.

The cooling ribs 7, 9 as cooling elements are to be understood only as an exemplary embodiment. The cooling elements can be formed also by other configurations of the stator flange 3 or the annular flange 6. It is likewise possible to configure the sides of stator flange 3 and annular flange 6 that are facing each other to be planar.

The stator flange 3 has a slightly greater outer diameter in comparison to the annular flange 6 of the rotor 8. The stator flange 3 is provided with through openings 10 for fastening screws with which the electric motor can be fastened in the installed position.

Figure 5:
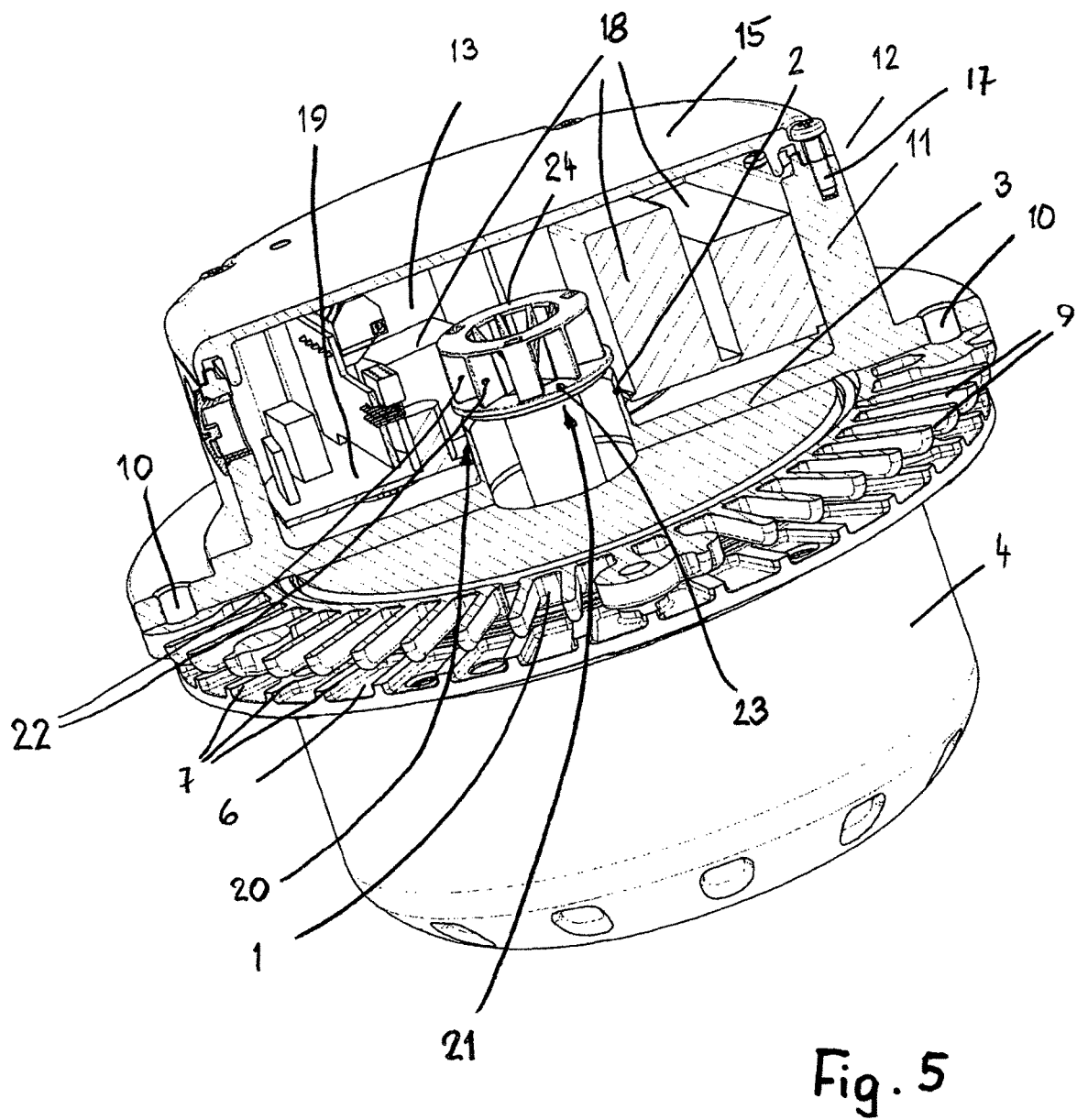
FIG. 5 in perspective illustration and in axial section view the area of the electronics housing of the electric motor according to the invention.

On the side that is facing away from the annular flange 6, a wall 11 of an electronics housing 12 is projecting perpendicularly away from the stator flange 3. The wall 11 extends advantageously cylindrically and delimits an installation space 13 of the electronics housing radially in outward direction. The wall 11 is advantageously formed as one piece together with the stator flange 3 and comprises on the circumference a depression 14 through which from the exterior, as is known in the art, connecting cables can be extended into the installation space 13. The depression 14 is closed off by at least one closure element through which the connecting cables project into the installation space 13 in a seal-tight way. The installation space 13 is closed off by a cover 15 which, with intermediate positioning of at least one seal 16, preferably a sealing ring, is detachably mounted on the end face of the wall 11 by means of screws 17. The screw heads are positioned advantageously countersunk in the cover top side (FIG. 5).

In the installation space 13 of the electronics housing 12, schematically illustrated electric/electronic components 18 are disposed which are required for operation of the electric motor. They are seated on a circuit board 19 which is mounted in a suitable way in the installation space 13. In the embodiment, the circuit board 19 is spaced apart from the stator flange 3. Centrally, the circuit board 19 is provided with an opening 20 through which the upper end of the stator bushing 2 is projecting.

For cooling the components 18 in the electronics housing 12, a fan wheel 21 is provided which is disposed in the installation space 13 on the side of the circuit board 19 which is facing away from the stator flange 3. It is fixedly connected with the rotor shaft and rotates together with the rotor 8. The fan wheel 21 has vanes 22 which are distributed about the circumference of the fan wheel and with which an air flow is generated in the installation space 13. The vanes 22 extend between a bottom disk 23 and a cover disk 24. The bottom disk 23 is positioned within the installation space 13 external to the stator bushing 2 at a spacing thereto.

Figure 6:
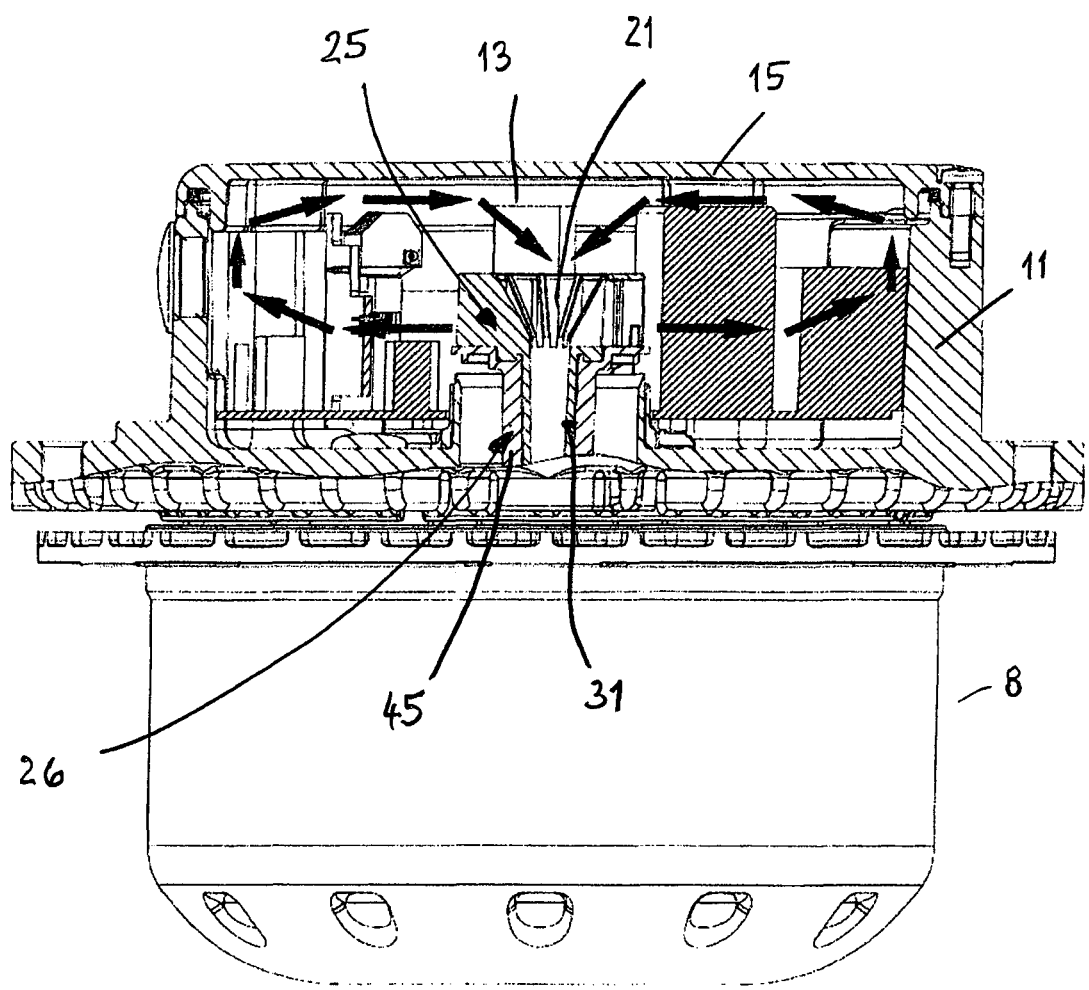
FIG. 6 the electric motor in an illustration corresponding to FIG. 3 with illustrated flow course of the cooling air.
Figure 7:
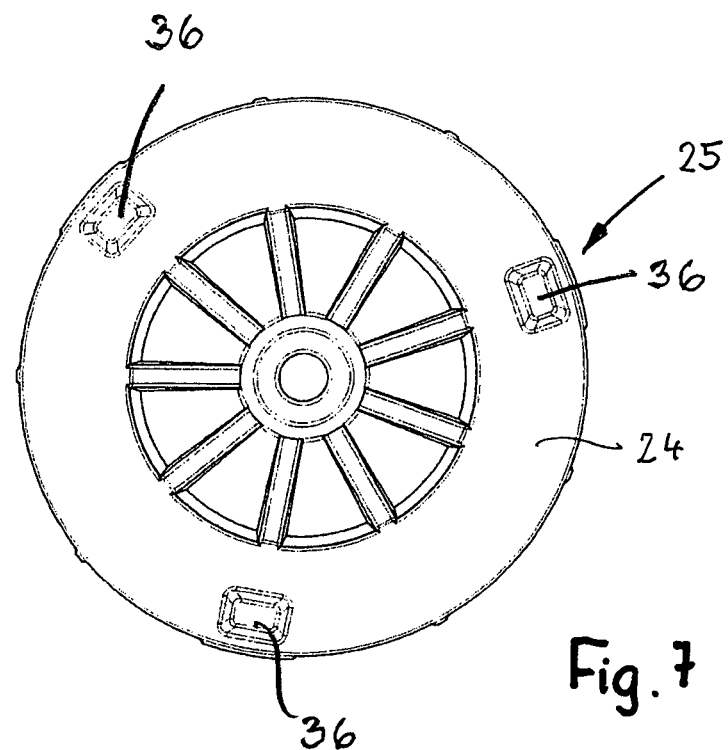
FIG. 7 a plan view of a base member of the fan wheel according to the invention.
Figure 8:
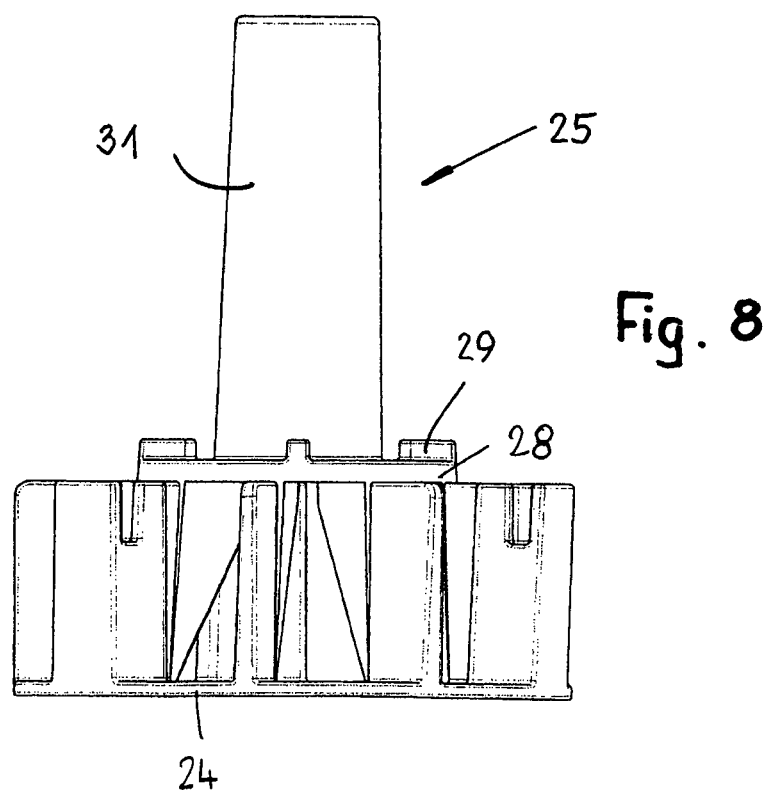
FIG. 8 a side view of the base member of the fan wheel according to FIG. 7.
Figure 9:
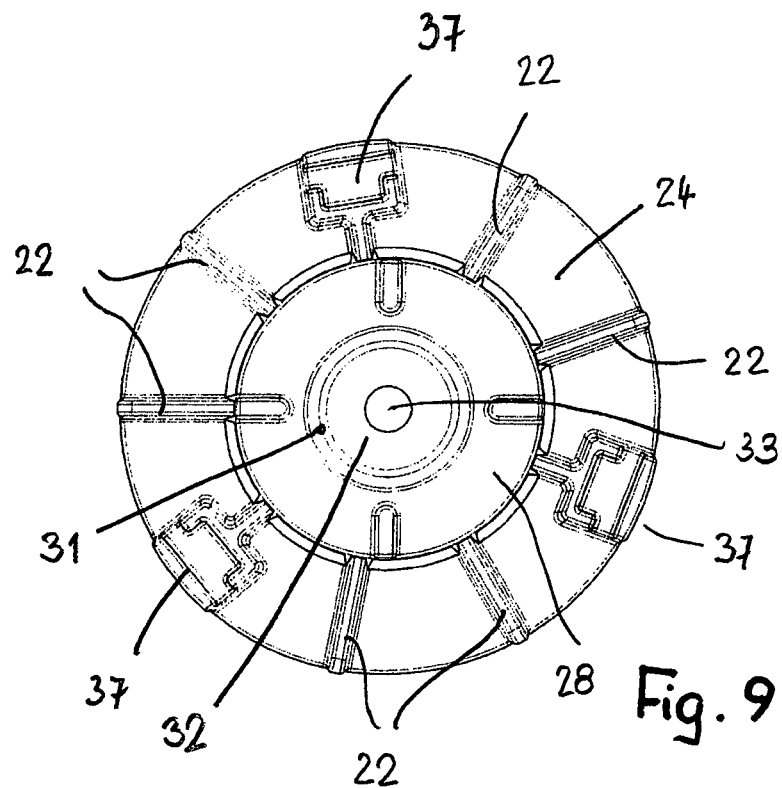
FIG. 9 a bottom view of the base member of the fan wheel.

The fan wheel 21 is located at the center of the installation space 13 and sucks in the cool air centrally, as is illustrated by the flow arrows in FIG. 6. The vanes 22 are arranged such that the centrally sucked-in cooling air is guided in radial direction outwardly. In doing so, the cooling air flows past the components 18 in the installation space 13 and absorbs the heat produced by the components 18. The electric/electronic components 18 are reliably cooled in this way. On the wall 11, the cooling air flow is deflected inwardly and again centrally drawn in by the fan wheel 21. The cover 15 which is closing off the installation space 13 also contributes to the deflection of the cooling air flow, as can be seen in FIG. 6. In this way, in the installation space 13 a defined cooling air flow as well as turbulence are generated between the components 18 by means of the fan wheel 21. The cooling air is guided about the entire circumference of the installation space 13 in the described way between the electronics components 18.

An optimal and reliable cooling of the components 18 is achieved in particular when the inner side of the wall 11 of the electronics housing 12 is of rotational symmetry about the axis of rotation of the fan wheel 21. This results in a uniform air flow about the circumference of the wall 11.

Advantageously, the components 18 on the circuit board 19 are arranged such that the cooling air can be guided past them in an optimal way. In particular, the components can be arranged to be distributed such that one component is not positioned in the slipstream of another component 18 positioned upstream. Due to this cooling air flow hotpots on temperature-critical components are avoided.

The heat is transferred partially by the deflection of the cooling air to the wall 11 of the electronics housing 12 and possibly to the cover 15.

Figure 15:
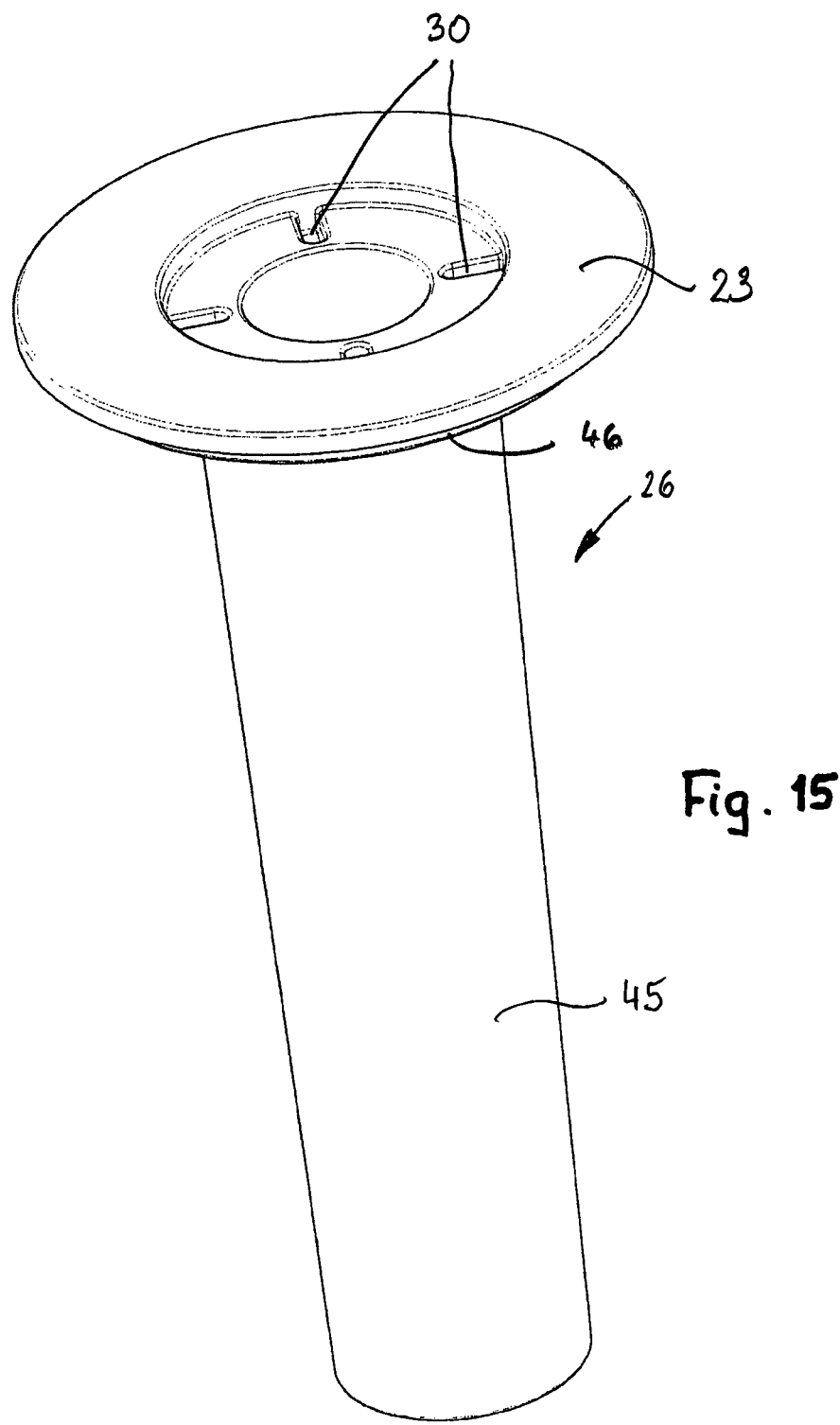
FIG. 15 the connector part of the fan wheel in perspective illustration and at a slant from above.

The fan wheel is of a two-part configuration and comprises the base member 25 as well as a connector part 26. The base member 25 comprises the annular cover disk 24 (FIGS. 7 to 11) which in the embodiment is planar but may also have a curved shape (with suction port). From the underside of the cover disk 24, the vanes 22 are projecting perpendicularly away and extend across the radial width of the cover disk 24 and advantageously are formed as one piece therewith. The radial inner corner area 27 (FIG. 11) of the vanes 22 are connected to an annular intermediate disk 28 which has a smaller outer diameter than the cover disk 24. From the bottom side facing away from the cover disk 24, ribs 29 are projecting away from the intermediate disk 28 and have, for example, an angular spacing of 90° relative to each other. The ribs 29 provide form-fit parts which in mounted position engage corresponding depressions 30 (FIG. 15) of the connector part 26. The ribs 29 extend radially from the outer rim of the intermediate disk 28 and end at a spacing relative to a fastening sleeve 31 which is centrally projecting away from the intermediate disk 28 on the side facing away from the cover disk 24. The fastening sleeve 31 tapers conically in the direction of its free end and is provided at the free end with a terminal disk 32 which is provided centrally with an opening 33 for a fastening screw (not illustrated). The terminal disk 32 is positioned in a radial plane of the fastening sleeve 31.

Figure 10:
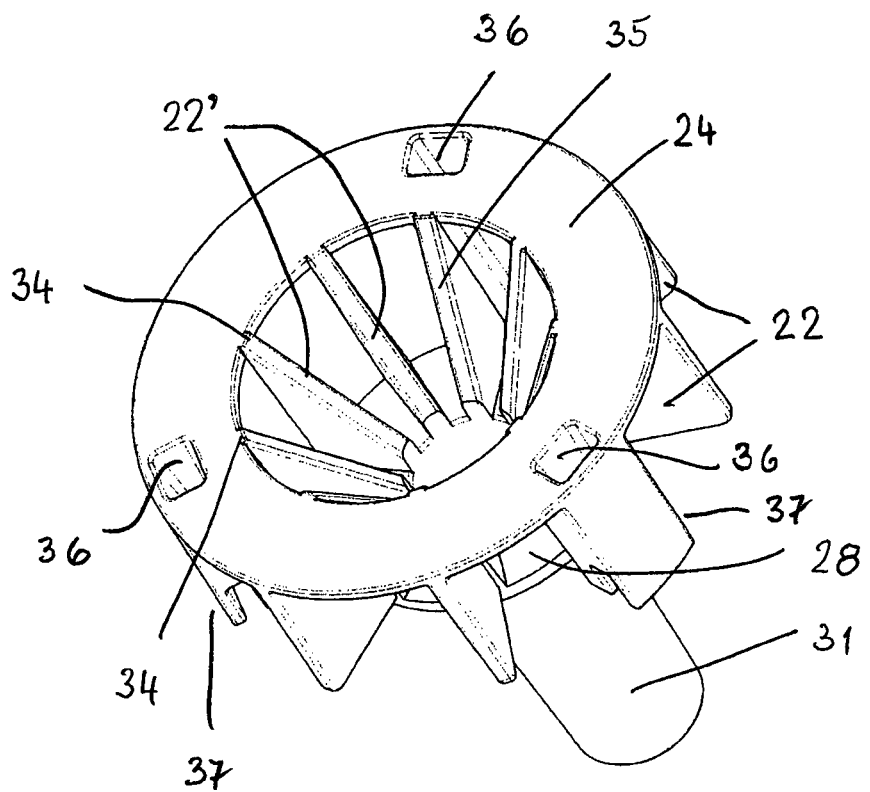
FIG. 10 the base member of the fan wheel in perspective illustration.
Figure 11:
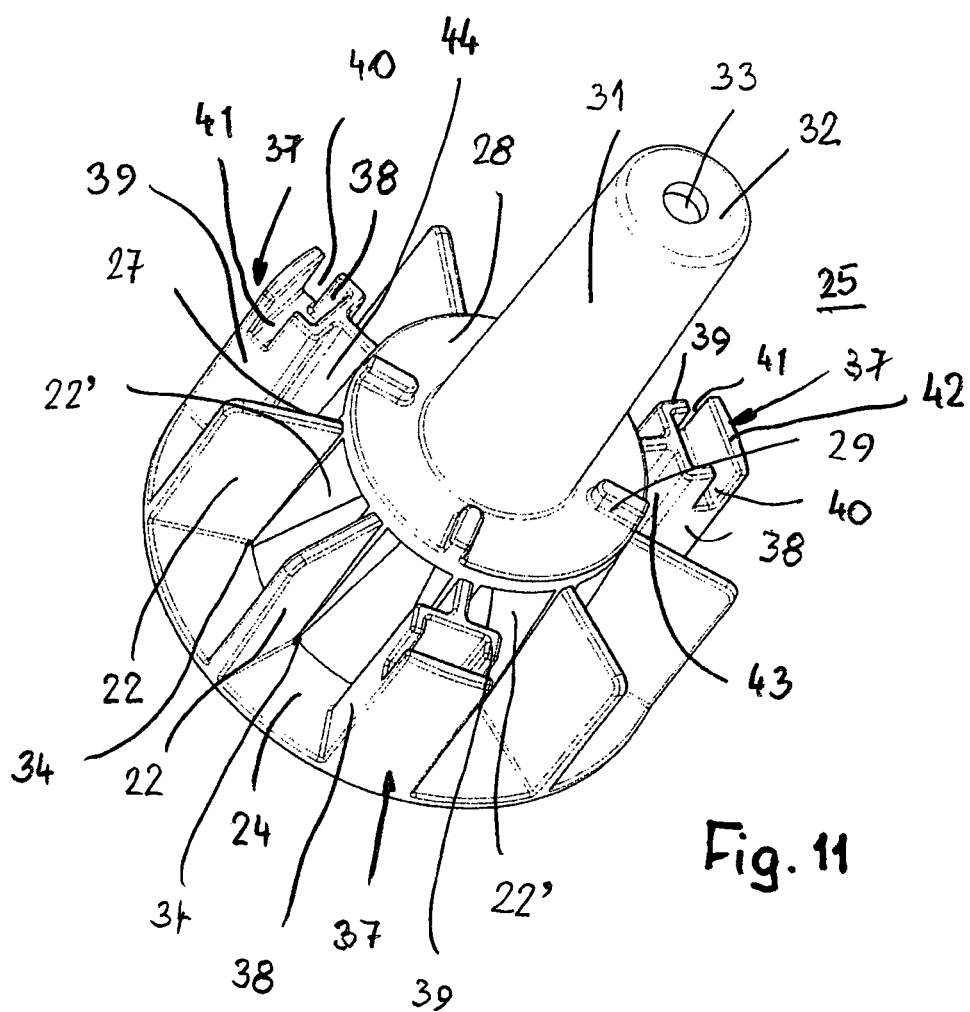
FIG. 11 in perspective illustration the base member of the fan wheel.

The vanes 22 have a rectangular contour, as can be seen in FIG. 11, for example. In radial inward direction, the vanes 22 are adjoined by a vane 22', respectively, that in elevation view is of a triangular shape and extends across the radial width of the intermediate disk 28 and tapers in the direction toward the cover disk 24 such that the vanes 22' with one of their corner areas 34 (FIG. 11) adjoin the inner rim of the cover disk 34. The vanes 22, 22' are positioned in the illustrated embodiment in radial planes, respectively, wherein the radial inner rim 35 of the triangular vanes 22' extend from the radial inner rim of the intermediate disk 28 at a slant outwardly such that the corner area 34 of these vanes 22' adjoin the inner rim of the cover disk 24 (FIG. 10).

The cover disk 24 comprises in an exemplary fashion three openings 36, as shown in FIG. 10, which advantageously are uniformly distributed about the circumference of the cover disk 24. At the bottom side of the cover disk 24, a hollow chamber 37 adjoins the openings 36, respectively, that have in an exemplary fashion a rectangular contour. It has rectangular contour (FIG. 11) and is open at the free end. In the two sidewalls 38, 39 that extend transversely to the circumferential direction of the cover disk 24 recesses 40, 41 which each have the same depth are provided at the same level. The sidewalls 38, 39 adjoin perpendicularly the sidewalls 42, 43 and, of these, the sidewall 42 is arranged at the level of the outer rim of the cover disk. The sidewall 43 extending parallel to it has a spacing relative to the inner rim of the cover disk 24. At half the circumferential width of the wall 43, a rib 44 is perpendicularly projecting which has the same height as the hollow chamber 37 and with its one rim adjoins the outer rim of the intermediate disk 28 and with the opposite rim adjoins the inner rim of the cover disk 24. The hollow chambers 37 have the same axial height as the vanes 22. As is disclosed in an exemplary fashion in FIG. 9, there are two vanes 22 arranged in circumferential direction between hollow chambers 37, respectively.

The hollow chambers 37 can serve for example for receiving magnets that, in an exemplary fashion, are used for rotary speed detection of the rotor 8.

The entire base member 25 of the fan wheel 21 is advantageously produced monolithically of plastic material, preferably as an injection molded part. When the vanes 22, 22' are designed to extend radially, no complex injection molds are required.

For attachment of the base member 25 on the rotor shaft, the connector part 26 is used which forms a coupling member for the fan wheel 21. By means of the connector part 26, it is possible to arrange the fan wheel 21 in such a way in the installation space 13 that it can convey the cooling air to all of the components 18 contained in the installation space. As can be seen in an exemplary fashion in FIGS. 1 through 6, the fan wheel 21 or its base member 25 is positioned at a spacing relative to the circuit board 19 in the installation space 13 so that the electric/electronic components 18 can be loaded reliably with cooling air.

The connector part 26 has a sleeve 45 which in the direction toward its free end tapers conically and is matched at the inner side to the fastening sleeve 31 of the base member 25 such that, when the fan wheel 21 is mounted, the fastening sleeve 31 is positioned opposite the inner wall of the sleeve 45 with minimal radial clearance, for example, 0.2 to 0.3 mm. The base member 25 is inserted with its fastening sleeve 31 into the sleeve 45 of the connector part 26. An alignment of the base member 25 relative to the connector part 26 in circumferential direction is the result of the ribs 29 of the base member 25 engaging the depressions 30 of the connector part 26.

The connector part 26 comprises the bottom disk 23 on which, when the base member 25 is mounted, the vanes 22 and the hollow chambers 37 are resting with their rims. In the embodiment, the bottom disk 23 of the connector part 26 has a slightly greater outer diameter than the cover disk 24 of the base member 25. However, both disks can also have the same outer diameter.

Figure 13:
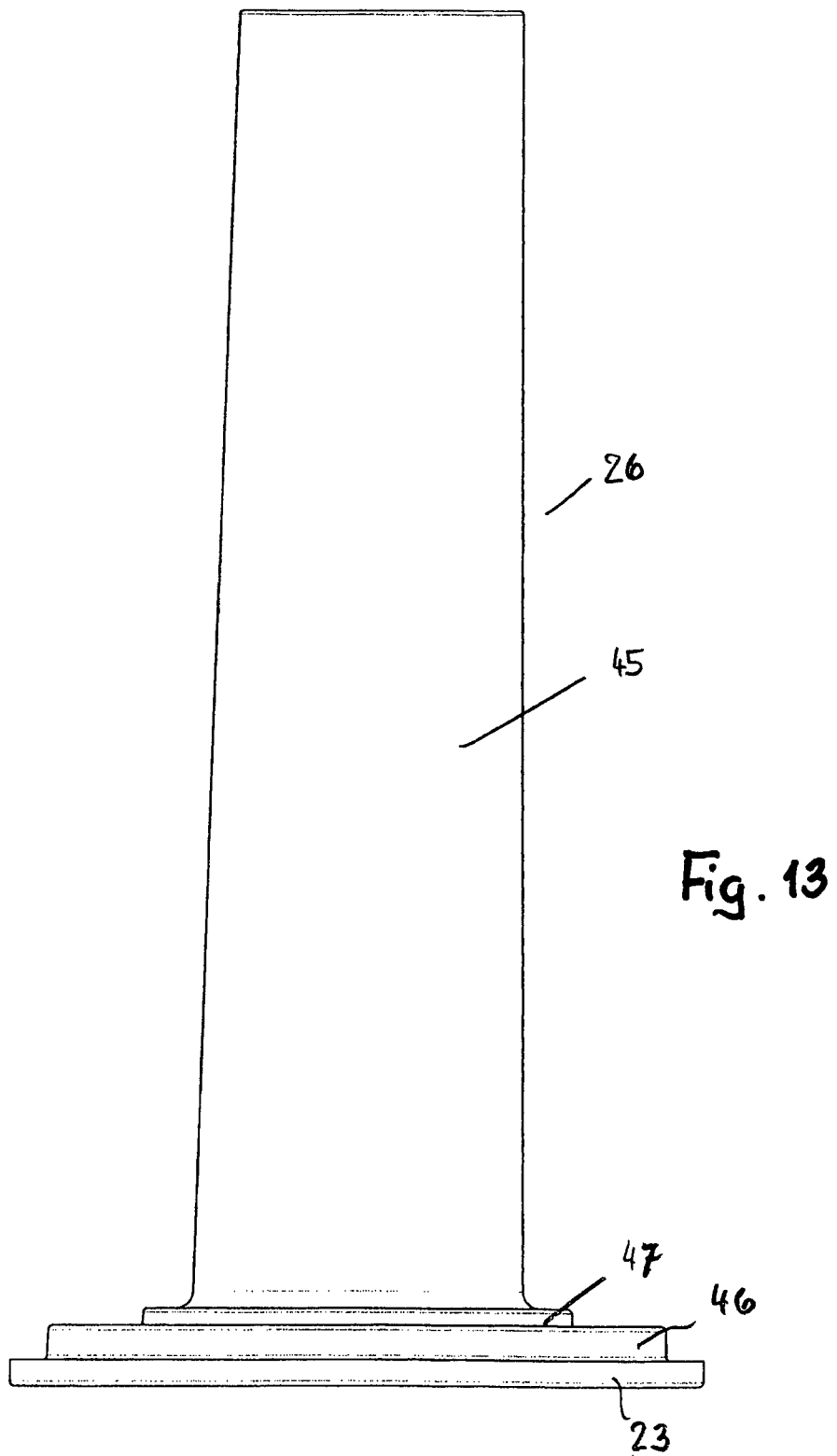
FIG. 13 in enlarged illustration and in a side view the connector part of the fan wheel.
Figure 14:
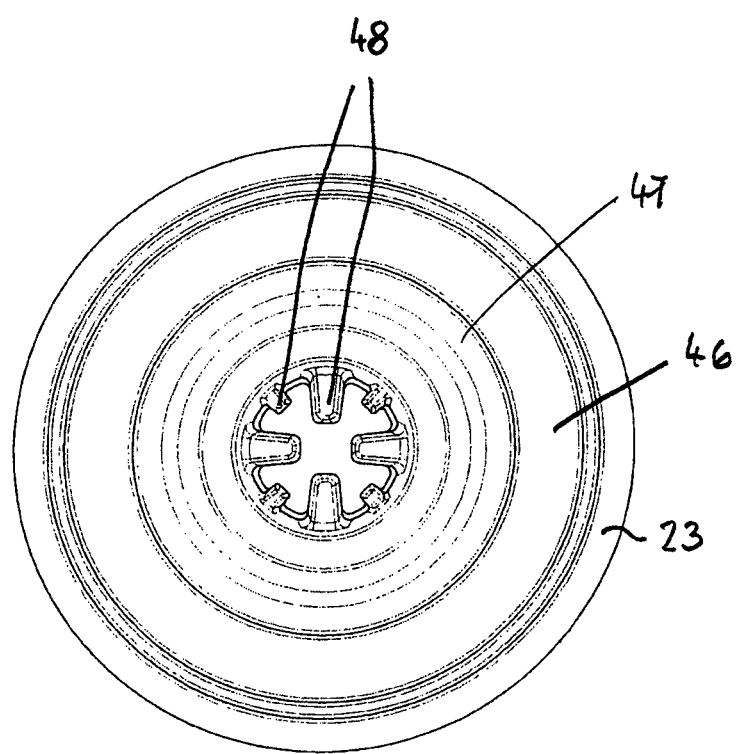
FIG. 14 a bottom view of the connector part of the fan wheel.
Figure 16:
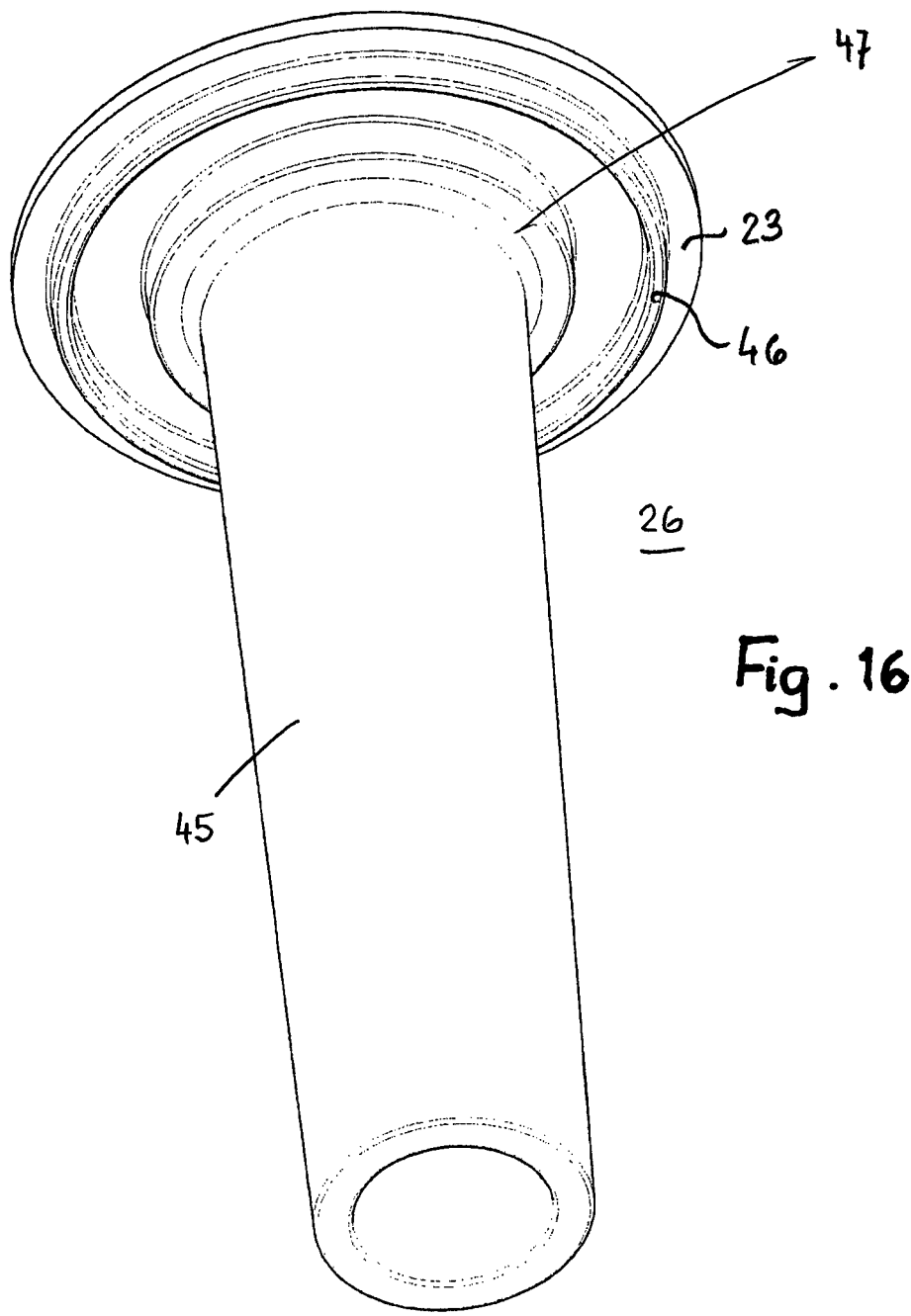
FIG. 16 in perspective illustration at a slant from below the connector part of the fan wheel.
Figure 17:
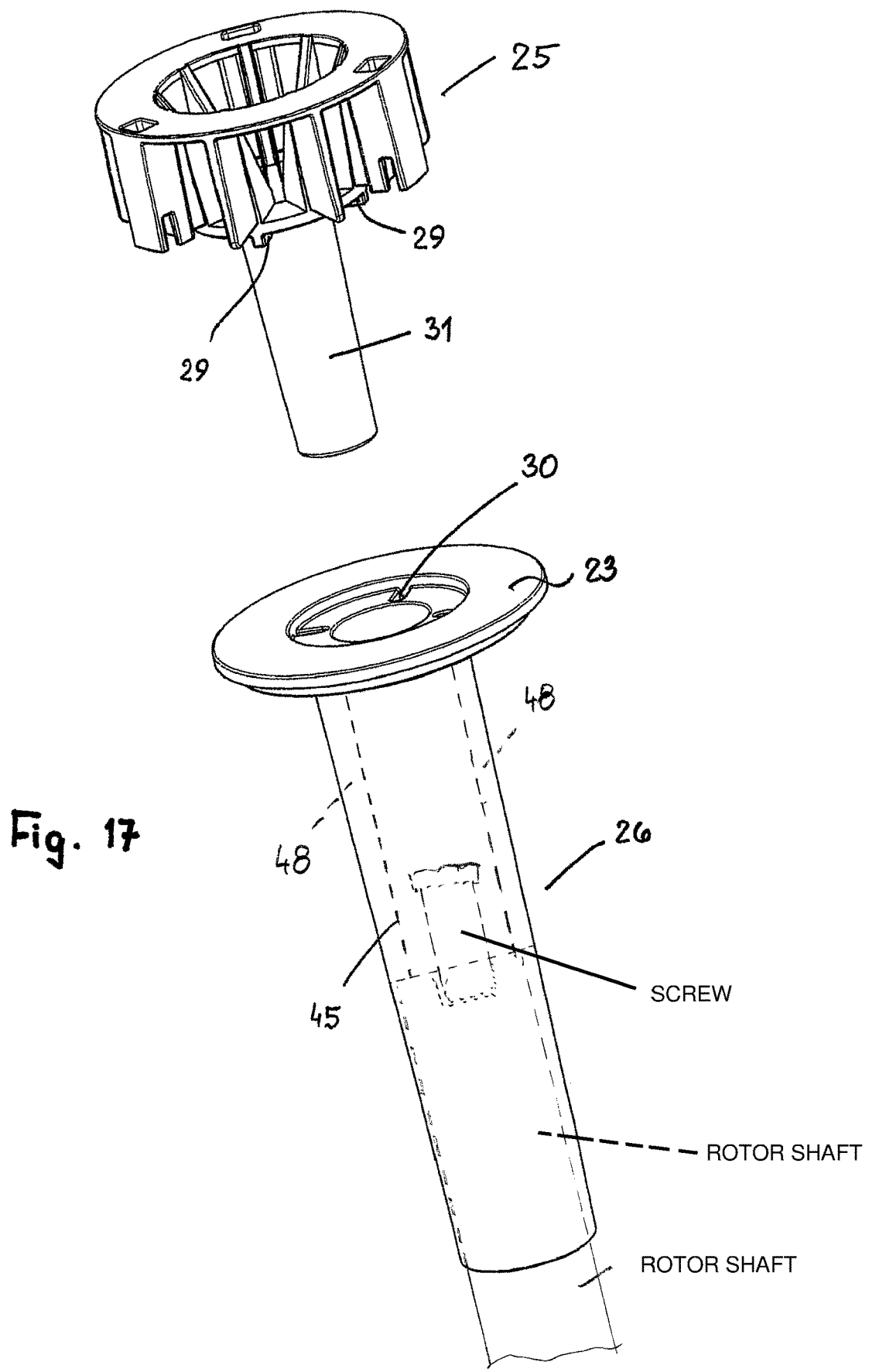
FIG. 17 in perspective and exploded illustration the base member and the connector part of the fan wheel.

On the bottom disk 23, on the bottom side which is facing away from the base member 25, an intermediate disk 46 is resting (FIGS. 13 and 16) which has a smaller outer diameter and a smaller inner diameter than the bottom disk 23. In the intermediate disk 46 the depressions 30 are provided which are engaged by the ribs 29 of the base member 25.

The bottom side of the intermediate disk 46 which is facing away from the bottom disk 23 is adjoined by an end disk 47 (FIG. 13) which has a smaller outer diameter than the intermediate disk 46 and from which centrally the sleeve 45 is projecting away.

The inner diameter of the bottom disk 23 corresponds to the outer diameter of the intermediate disk 28 of the base member 25. In this way, the base member 25 in the installed position is properly aligned relative to the connector part 26 not only in circumferential direction but also in radial direction.

Figure 12:
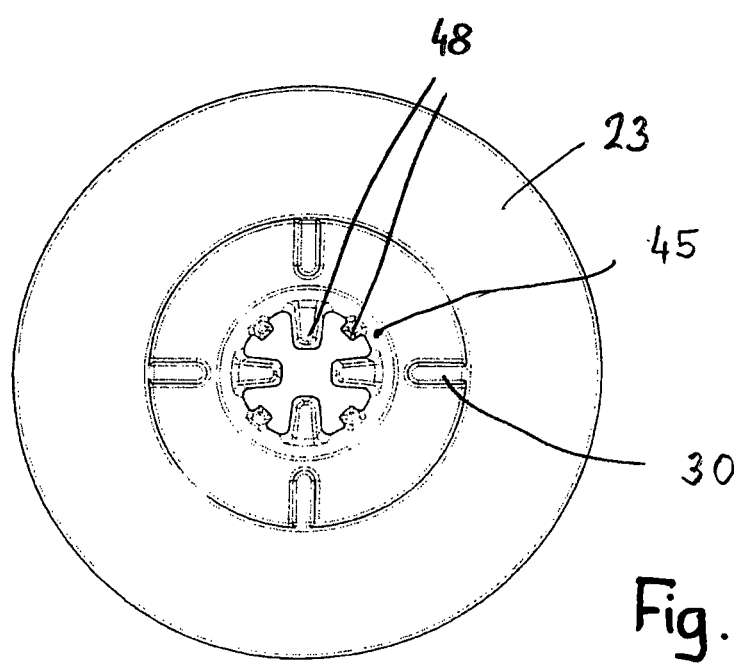
FIG. 12 a plan view of the connector part of the fan wheel.

From the inner wall of the sleeve 45, ribs 48 are projecting away radially in inward direction (FIG. 12) and extend at least across a portion of the axial length of the sleeve 45 and reinforce it. In the embodiment, alternating radially shorter and longer ribs 48 are provided and arranged at an angular spacings of 45°, respectively.

For mounting the fan wheel 21, the base member 25 is inserted into the connector part 26. The alignment of the two parts of the fan wheel 21 is realized by the ribs 29 (in circumferential direction) as well as by the rim of the intermediate disk 28 and the bottom disk 23 (in radial direction). Subsequently, from the side of the cover disk 24, a fastening screw is inserted through the fastening sleeve 31 and the opening 33 and screwed into the threaded bore of the rotor shaft at the end face. The ribs 48 serve in this context for guiding the fastening screw. Also, they serves as a stop for the connector part 26 which is contacting with the ribs 48 axially the rotor shaft. The base member 25 is positioned with its terminal disk 32 on the ribs 48 of the connector part 26. Upon tightening the fastening screw in axial direction, both parts of the fan wheel 21 are axially fixedly clamped relative to each other as a result of the contact of the terminal disk 32 of the base member 25 on the ribs 48 of the connector part 26 and fastened to the rotor shaft. The sleeve 45 has at its free end such an inner diameter that it can engage across the rotor shaft so that the fan wheel 21 transversely to the axial direction is reliably and fixedly connected with the rotor shaft. The ribs 48 are positioned at such a spacing relative to the free end of the sleeve 45 that the connector part 26 can engage the rotor shaft across a sufficient length.

Depending on the axial spacing of the installation space 13 from the rotor shaft, the fastening sleeve 31 of the base member 25 and the sleeve 45 of the connector part 26 have different axial lengths so that, depending on the configuration of the electric motor, the fan wheel 21 can be installed in the installation space 13 in the position required for cooling the components 18.

The bottom part 26 is advantageously formed as a monolithic part of plastic material, advantageously by injection molding.

Instead of the two-part configuration, the fan wheel 21 can also be comprised only of the base member 25. In this case, the intermediate disk 28 forms the bottom disk which, in interaction with the cover disk 24 and the vanes 22, 22', provides the described cooling air flow.

What is claimed is:

1. An electric motor comprising:
   a rotor and a stator;
   an electronics housing comprising a sidewall and a cover, wherein the sidewall delimits an installation space of the electronics housing radially in an outward direction, wherein the cover closes off an interior of the installation space in an axial direction to an exterior;
   electric/electronic components disposed in the installation space, wherein at least some of the electric/electronic components are mounted on a circuit board;
   a fan wheel arranged within the installation space and configured to suck in air centrally and to discharge the air approximately radially in the outward direction such that a cooling circuit flow is generated in the installation space, wherein the fan wheel is arranged in a space delimited radially in the outward direction by the electric/electronic components surrounding the space so that the electric/electronic components are distributed about a circumference of the fan wheel, and the fan wheel and all of the electric/electronic components are arranged at a same axial level;
   wherein the sidewall and the cover form guide means for the cooling circuit flow;
   wherein the cooling circuit flow flows radially from the fan wheel in the outward direction directly and without deflection toward and past the electric/electronic components to absorb heat produced by the electric/electronic components and cool the electric/electronic components.

2. The electric motor according to claim 1, wherein the fan wheel comprises vanes positioned in an area between a cover disk of the fan wheel and a bottom disk of the fan wheel.

3. The electric motor according to claim 1, wherein the fan wheel is arranged centrally in the installation space and arranged centrally between the electric/electronic components at the same axial level.

4. The electric motor according to claim 1, wherein an inner wall of the sidewall of the installation space is substantially cylindrical.

5. The electric motor according to claim 1, wherein the circuit board is arranged at a spacing relative to a stator flange of the stator, wherein the stator flange closes off the installation space relative to the rotor.

6. The electric motor according to claim 5, wherein the stator comprises a stator bushing adjoining the stator flange, wherein a rotor shaft of the rotor is rotatably supported in the stator bushing.

7. The electric motor according to claim 1, wherein the fan wheel comprises a base member comprising a cover disk and vanes connected to the cover disk and having free rims opposite the cover disk, wherein the fan wheel further comprises a connector part embodied as a separate part separate and discrete from the base member, wherein the connector part comprises a bottom disk, wherein the base member is placed on the connector part so that the vanes extend between the cover disk and the bottom disk and the free rims of the vanes are resting on the bottom disk, wherein the connector part connects the fan wheel fixedly to a rotor shaft of the rotor, and wherein the connector part and the base member are fixedly connected to each other and rotate tog ether with the rotor shaft.

8. The electric motor according to claim 7, wherein the base member comprises a sleeve and the connector part comprises a sleeve, wherein the sleeve of the base member and the sleeve of the connector part engage each other and are fixedly connected to each other and rotate together with the rotor shaft.

9. The electric motor according to claim 8, wherein the sleeve of the base member is positioned with clearance opposite an inner wall of the sleeve of the connector part.

10. A fan wheel for an electric motor, the fan wheel comprising:
    a base member that comprises vanes and a cover disk;
    a connector part embodied separate from the base member and comprising a bottom disk, wherein the base member and the connector part are joined with each other and wherein the vanes are positioned between the cover disk and the bottom disk, wherein the vanes are resting on the bottom disk of the connector part;
    wherein the base member comprises a sleeve and the connector part comprises a sleeve, wherein the sleeve of the base member and the sleeve of the connector part engage each other and are configured to rotate together with a rotor shaft of the electric motor.

11. The fan wheel according to claim 10, wherein the vanes and the base member together are formed as a monolithic part.

12. The fan wheel according to claim 10, wherein the base member and the connector part comprise stops and are contacting each other with the stops in axial direction.

13. The fan wheel according to claim 10, wherein the sleeve of the base member extends in an axial direction of the fan wheel.

14. The fan wheel according to claim 13, wherein the sleeve of the base member conically tapers in a direction toward a free end of the sleeve of the base member.

15. The fan wheel according to claim 14, wherein the sleeve of the base member at the free end is closed off by a terminal disk that comprises an opening as a passage of a fastening screw.

16. The fan wheel according to claim 10, wherein the sleeve of the connector part extends in an axial direction of the fan wheel.

17. The fan wheel according to claim 16, wherein the sleeve of the connector part conically tapers in a direction toward a free end of the sleeve of the connector part.

18. The fan wheel according to claim 10, wherein the sleeve of the base member extends in an axial direction of the fan wheel and the sleeve of the connector part extends in the axial direction of the fan wheel, wherein the sleeve of the base member is positioned with radial clearance opposite an inner wall of the sleeve of the connector part.

19. The fan wheel according to claim 10, wherein the base member and the connector part are connected to each other with form fit in circumferential direction of the fan wheel and/or in radial direction of the fan wheel.

20. An electric motor comprising a fan wheel, wherein the fan wheel comprises a base member comprising a cover disk and vanes connected to the cover disk and having free rims opposite the cover disk, wherein the fan wheel further comprises a connector part embodied as a separate part separate and discrete from the base member, wherein the connector part comprises a bottom disk, wherein the base member is placed on the connector part so that the vanes extend between the cover disk and the bottom disk and the free rims of the vanes are resting on the bottom disk, wherein the connector part connects the fan wheel fixedly to a rotor shaft of a rotor of the electric motor, wherein the base member comprises a sleeve and the connector part comprises a sleeve, wherein the sleeve of the base member and the sleeve of the connector part engage each other and rotate together with the rotor shaft.

\* \* \* \* \*